United States Patent
Bean et al.

(10) Patent No.: US 9,557,951 B2
(45) Date of Patent: *Jan. 31, 2017

(54) FILTERING INFORMATION WITHIN AUGMENTED REALITY OVERLAYS

(71) Applicant: International Business Machines Corporation, Armonk, NY (US)

(72) Inventors: Chris Bean, Chandler's Ford (GB); Sophie D. Green, South Woodham Ferrers (GB); Stephen R. F. Head, Southampton (GB); Madeleine R. Neil Smith, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,708

(22) Filed: Jul. 28, 2015

(65) Prior Publication Data

US 2016/0259608 A1  Sep. 8, 2016

Related U.S. Application Data

(63) Continuation of application No. 14/637,553, filed on Mar. 4, 2015.

(51) Int. Cl.

| | |
|---|---|
| *G06T 19/00* | (2011.01) |
| *G06F 3/14* | (2006.01) |
| *G06T 7/00* | (2006.01) |
| *G01C 21/36* | (2006.01) |
| *G06F 3/01* | (2006.01) |
| *G06K 9/00* | (2006.01) |
| *G02B 27/01* | (2006.01) |

(52) U.S. Cl.
CPC ............ *G06F 3/14* (2013.01); *G01C 21/3679* (2013.01); *G06F 3/012* (2013.01); *G06K 9/00671* (2013.01); *G06T 7/0042* (2013.01); *G06T 19/006* (2013.01); *G02B 27/017* (2013.01)

(58) Field of Classification Search
None
See application file for complete search history.

(56) References Cited

U.S. PATENT DOCUMENTS

| 8,687,021 B2 | 4/2014 | Bathiche et al. |
| 8,743,145 B1 | 6/2014 | Price |
| (Continued) | | |

OTHER PUBLICATIONS

Zan et al., "Speed-Vision: Speed Measurement by License Plate Reading and Tracking," IEEE. 2001.*

(Continued)

*Primary Examiner* — Kee M Tung
*Assistant Examiner* — Nicholas R Wilson
(74) *Attorney, Agent, or Firm* — Nicholas D. Bowman

(57) ABSTRACT

Augmented reality overlays for display to a user of an augmented reality device are managed. An object of is received. As received, the object is associated with an augmented reality marker within a field of view of the user. Information associated with the object is for display in an overlay. The speed of the augmented reality marker relative to the user is calculated. This speed of the augmented reality marker is compared with a threshold value. Responsive to the speed of the augmented reality marker being greater than the threshold value, the information is filtered out from the overlay, and the filtered overlay is displayed on the augmented reality device.

18 Claims, 5 Drawing Sheets

(56) References Cited

U.S. PATENT DOCUMENTS

| | | | |
|---|---|---|---|
| 8,817,047 B1* | 8/2014 | Lee | G09G 3/003 345/632 |
| 2012/0001938 A1 | 1/2012 | Sandberg | |
| 2012/0038669 A1 | 2/2012 | Lee et al. | |
| 2013/0057581 A1 | 3/2013 | Meier | |
| 2013/0073988 A1 | 3/2013 | Groten et al. | |
| 2013/0147837 A1 | 6/2013 | Stroila | |
| 2014/0028715 A1 | 1/2014 | Fulks et al. | |
| 2014/0253588 A1 | 9/2014 | Mandala | |

OTHER PUBLICATIONS

Google, "Google Now. The right information at just the right time.", 5 pages, https://www.google.co.uk/landing/now (last accessed Feb. 17, 2015 10:55 AM).

Gotow, et al., "Addressing Challenges with Augmented Reality Applications on Smartphones," In Mobile Wireless Middleware, Operating Systems, and Applications, pp. 129-143. Springer Berlin Heidelberg, 2010.

Kalkofen, et al., "Comprehensible Visualization for Augmented Reality," IEEE Transactions on Visualization and Computer Graphics, vol. 15, No. 2, Mar./Apr. 2009, DOI 10.1109/TVCG.2008.96, pp. 193-204.

Bean et al., "Filtering Information Within Augmented Reality Overlays," U.S. Appl. No. 14/637,553, filed Mar. 4, 2015.

List of IBM Patents or Patent Applications Treated as Related, Jul. 24, 2015, 2 pages.

International Search Report and the Written Opinion of the International Searching Authority, International Application No. PCT/EP2016/054336, Filed Mar. 1, 2016, 12 pages.

* cited by examiner

FILTERING INFORMATION WITHIN AUGMENTED REALITY OVERLAYS

BACKGROUND

The present invention relates to augmented reality overlays, and more specifically, to filtering information within augmented reality overlays for display on augmented reality devices.

Augmented reality devices display overlays to a user to provide additional information on objects around the user. A well-documented problem with augmented reality devices is knowing which information to display to the user such that the user is not bombarded with irrelevant information on things that the user is not interested in.

Prior art attempts to solve this problem include means of analyzing the user's interests and history to rank potential displays on a smartphone in terms of relevance to the user. One such prior art solution is Google® Now (https://www-.google.co.uk/landing/now/). Google Now is an intelligent personal assistant which uses a natural language user interface to answer questions, make recommendations and perform actions by delegating requests to a set of web services. Along with answering user-initiated queries, Google Now proactively delivers information to the user that it predicts she will want, based on her search habits. Whilst Google Now addresses the problem of only showing smartphone displays relevant to the user, it doesn't help reduce the number of overlays displayed on an augmented reality device that may be moving too fast or may be too small for a user to correctly digest.

U.S. Pat. No. 8,687,021 B2 discloses an augmented reality system which personalizes real-world experiences by overlaying or interspersing virtual capabilities (and data) with real world situations. Virtual world information can be filtered, ranked, modified or ignored based upon a particular real-world class, user identity or context.

U.S. Pat. No. 8,743,145 B1 discloses that augmented reality information to be displayed may be filtered based on user preferences and priorities for presentation as a real-time augmented reality overlay to the user.

U.S. Patent Application 2012/0038669 A1 discloses a user equipment, a server, and a method for augmented reality for selecting a filter, and more particularly, to a user equipment, a server for augmented reality (AR), and a method for selecting a filter to apply selective filtering to an object selected by the user.

SUMMARY

According to an embodiment of the invention, a method of managing augmented reality overlays for display to a user of an augmented reality device is provided. An object is received, the object being associated with an augmented reality marker within a field of view of the user, information associated with the object being for display in an overlay. The speed of the augmented reality marker relative to the user is calculated. The speed of the augmented reality marker is compared with a threshold value. Responsive to the speed of the augmented reality marker being greater than the threshold value, the information is filtered out from the overlay. The filtered overlay is displayed on the augmented reality device. Embodiments of the method of managing augmented reality overlays provide the advantage that which information is displayed to a user is responsive to the speed at which an object is moving out of the user's field of view or away from the user, thus reducing the amount of information displayed on the screen that the user would not have interacted with.

Preferably, the step of calculating the speed of the augmented reality marker relative to the user calculates the radial speed of the augmented reality marker relative to the user. The calculation of radial speed has the advantage of reducing the amount of information in an overlay responsive to the speed at which an object is moving out of the user's field of view.

Preferably, the speed of the augmented reality marker relative to the user is the difference between a first Euclidean distance between the augmented reality marker and the center of the field of view of the user in a first frame and a second Euclidean distance between the augmented reality marker and the center of the field of view of the user in a second subsequent frame, divided by the time between the first frame and a second subsequent frame. An embodiment in which the Euclidean distance and the time between frames is used to calculate the speed has the advantage of allowing fast and easy calculation of the speed.

Preferably, the threshold value is calculated based on at least one of a user level of interest for the object and an information density value for the object. An embodiment in which a user level of interest and/or information density value is used to calculate the threshold value has the advantage of allowing a variable threshold value that is calculated based on relevant contextual information.

Preferably, the threshold value is equal to the interest of the user level of interest for the object multiplied by a constant and divided by the information density value for the object. An embodiment in which the threshold value is calculated in this way has the advantage that items of greater interest to a user are more likely to be displayed as are items that are smaller, thus increasing the proportion of overlays displayed to the user that the user is more likely to interact with.

In an embodiment, responsive to the speed of the augmented reality marker relative to the user being similar to the threshold value, filtering out the information from the overlay and incorporating in the filtered overlay a summary of the information so as to reduce an information density value for the object. An embodiment in which the information associated with the object is summarized has the advantage of still displaying some form of the information associated with the object in the overlay, but also allowing the user to comfortably focus on the information.

In another embodiment, responsive to the speed of the augmented reality marker relative to the user being similar to the threshold value, filtering the overlay by slowing the movement of the augmented reality marker in the overlay relative to the object so as to reduce the speed of the augmented reality marker relative to the user. An embodiment in which the augmented reality marker is slowed has the advantage of displaying the information associated with the object, but also allowing the user to comfortably focus on the information.

Embodiments of the invention provide a system for managing augmented reality overlays for display to a user of an augmented reality device in which an object is received, the object being associated with an augmented reality marker within a field of view of the user and information associated with the object being for display in an overlay. An object speed calculator calculates the speed of the augmented reality marker relative to the user. A comparator compares the speed of the augmented reality marker with a threshold value. An overlay modifier, responsive to the speed of the augmented reality marker being greater than the threshold value, filters out the information from the overlay. An overlay displayer displays the filtered overlay on the augmented reality device.

Embodiments of the invention also provide a computer program product for managing augmented reality overlays for display to a user of an augmented reality device, the computer program product comprising a computer readable storage medium having program instructions. The program instructions are executable by a computer to cause the computer to receive an object, the object being associated with an augmented reality marker within a field of view of the user and information associated with the object being for display in an overlay. The program instructions also cause the computer to calculate the speed of the augmented reality marker relative to the user. The program instructions also cause the computer to compare the speed of the augmented reality marker with a threshold value. The program instructions also cause the computer to, responsive to the speed of the augmented reality marker being greater than the threshold value, filter out the information from the overlay. And the program instructions also cause the computer to display the filtered overlay on the augmented reality device.

BRIEF DESCRIPTION OF THE DRAWINGS

Preferred embodiments of the present invention will now be described in more detail, by way of example only, with reference to the accompanying drawings, in which.

DETAILED DESCRIPTION

Figure 1:
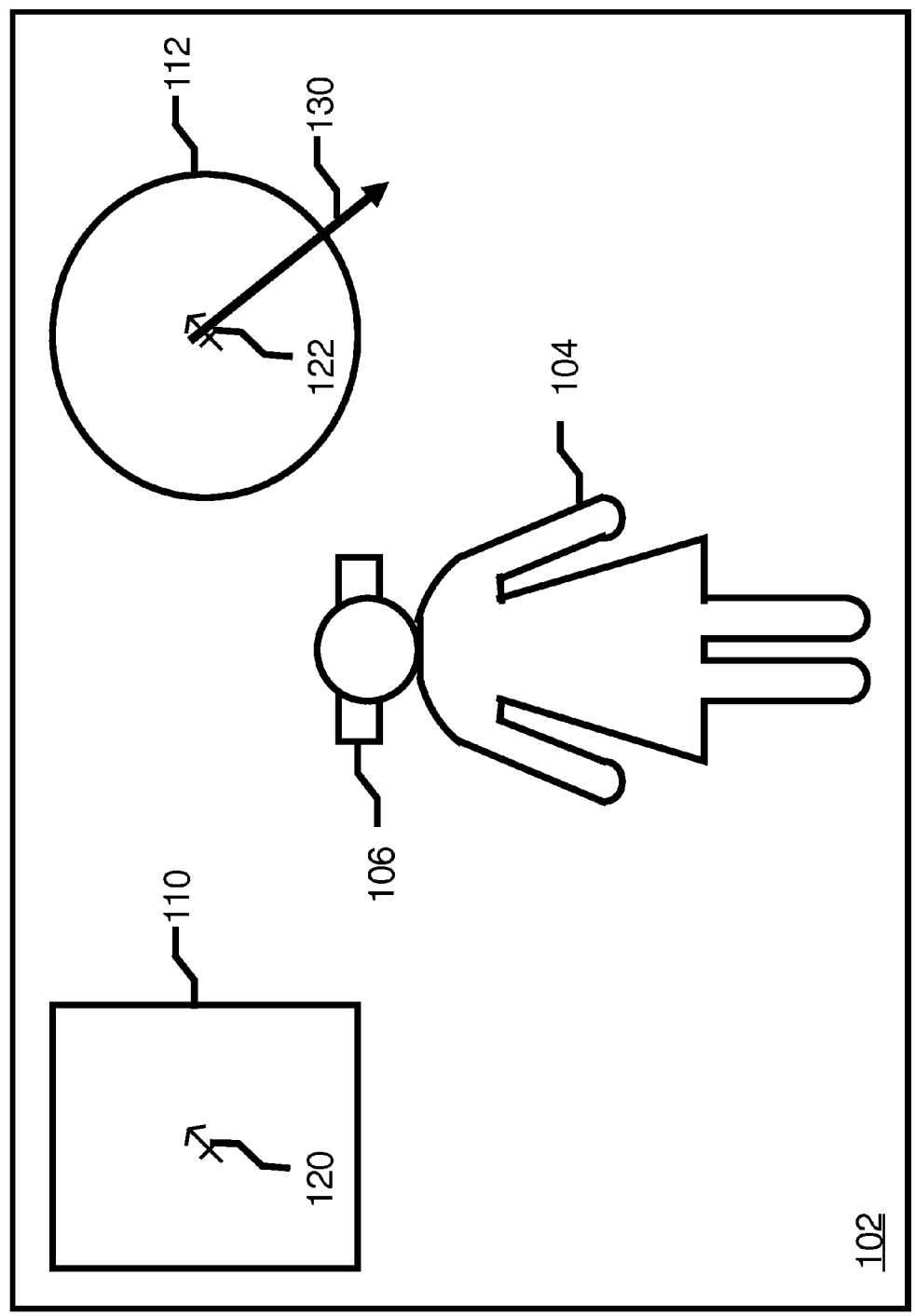
FIG. 1 shows an augmented reality environment having objects in the field of vision of an augmented reality display.

FIG. 1 shows an augmented reality environment 102 in which a user 104 views her real world environment through an augmented reality device 106. Augmented reality device 106 may be head-mounted with a virtual image superimposed on the direct view of the real world seen by the user 104, or it may be a device, such as a handheld device, which displays both the real world view and the virtual image on the same display screen. The virtual image typically comprises one or more overlays. Each overlay is typically associated with one or more objects 110, 112 within the real world view as seen by the user 104. Within the field of view of the user 104 are two real world objects 110, 112. In the example of FIG. 1, real world object 110 is stationary or near stationary, whilst real world object 112 is moving in the direction shown by arrow 130. Real world object 110 is represented in the overlay by a marker 120 to which any information associated with the real world object 110 (e.g., an annotation) is anchored. Similarly, real world object 112 is represented in the overlay by a marker 122 to which any information associated with the real world object 112 is anchored. As real world object 112 moves in the direction shown by arrow 130, the marker 122 moves with it, so that the marker's position continues to correspond with the position of the real world object 112 as seen by the user 104. In embodiments, the augmented reality markers 120, 122 within the field of view of the user 104 are not actually displayed to the user 104. Instead, in such embodiments, the augmented reality markers may be constructs used only by the augmented reality device 106 to track the objects 110, 112.

If real world object 112 is moving too fast for the information associated with it to be comfortably focused on by the user 104, then embodiments of the present invention filter out the object's 112 associated information so that it is not shown to the user 104. These embodiments of the present invention may calculate which overlays will be moving too fast for the user 104 to comfortably focus on. In embodiments this can be done through comparison of the augmented reality marker's 120, 122 radial speed relative to the user 104. For example, if the user 104 is walking down a street, the user 104 has more time and attention in order to observe what is going on around her and to read information shown to her as an overlay about the objects 110, 112 around her. This is in contrast to a user 104 who is perhaps late on her way to a meeting, or a user 104 that has her augmented reality headset 106 on whilst out for a jog. When the user 104 is traveling at a faster speed, a conventional augmented reality headset 106 is not practical to use because of the vast amount of information included in augmented reality overlays that would be moving past the user at speeds too fast for the user 104 to take in the information presented to her.

Figure 2:
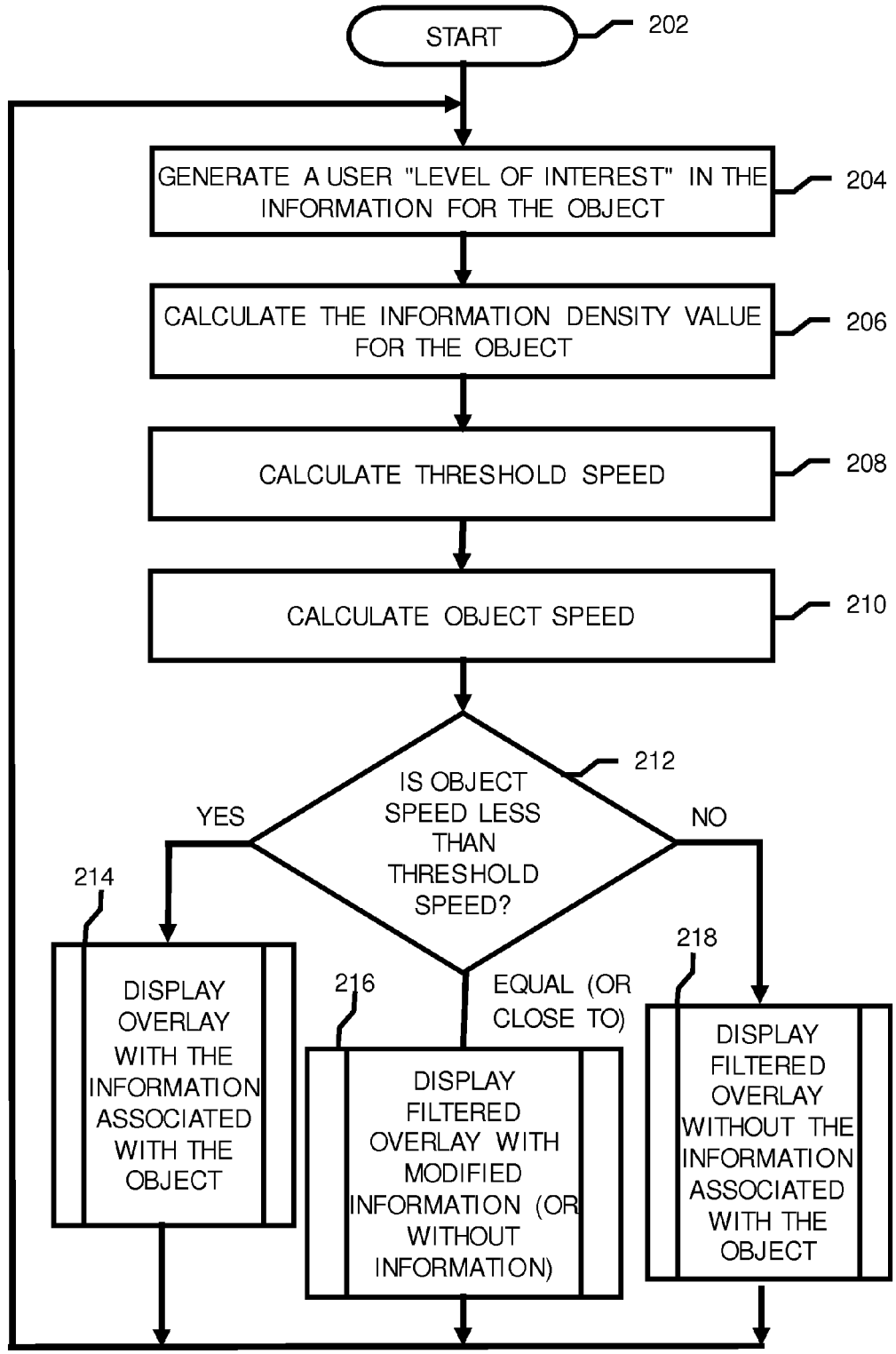
FIG. 2 shows a flow chart of an embodiment of a method of managing augmented reality overlays according to the present invention.

FIG. 2 shows a flow chart of an embodiment of a method of managing augmented reality overlays displayed to a user 104 of an augmented reality device 106 according to the present invention. The method starts at step 202. Associated with each object 110, 112 is information that is intended to be displayed as an overlay on the augmented reality device 106 at a location associated with the anchor 120, 122 of each of the objects 110, 112. An object of interest to the user 104 is received, the object associated with an augmented reality marker 120, 122 within a field of view of the user 104, information associated with the object being for display in an overlay.

At step 204, a "level of interest" of the information to the user 104 is generated. The "level of interest" may, for example, be determined from a preset list of preferences or settings in a user 104 profile. In another embodiment, the level of interest may be generated over a period of time by analyzing what types of information the user 104 looks at and for how long the user 104 looks at the information. In another embodiment, a user's 104 search habits may be used to determine her level of interest. This has the advantage that the user 104 is provided with information that it is predicted based on her interests as determined based on her search habits. An exemplary user 104 profile may indicate that a user 104 is interested in Italian cuisine, but not in Chinese cuisine. The level of interest associated with a Chinese restaurant will, in this example, be lower than the level of interest in an Italian restaurant.

At step 206, an amount of information in the overlay associated with the object is calculated. The amount of information may be expressed in a conventional metric such as the number of words or the number of pixels in the overlay. Examples of low information density values include information that is just a picture and information that is just placing a highlighting box over a real life object 110, 112. An example of a high density value is a piece of information that contains a whole block of text. An example of a medium density value is somewhere between these two examples, perhaps a picture with a caption, or, alternatively, short bullet points of text.

At step 208, a threshold speed for the information in the overlay associated with the object is calculated. The threshold speed may represent the maximum radial speed at which the information in the overlay can be displayed whilst still allowing a user 104 to comfortably focus on the information in the overlay. If the information in the overlay is displayed such that it moves at a radial speed exceeding the threshold speed for that information, then a user 104 may not be able to comfortably focus on the information in the overlay. The information would be moving too fast for the user 104 to read and would just take up unnecessary space in the user's 104 field of view. In an embodiment, the threshold speed based on an interest in and/or information density value for the object is calculated as:

Threshold speed=(Level of Interest/Information density)*Constant that is, the threshold value is equal to the user level of interest for the object multiplied by a constant and divided by the information density value for the object.

The "level of interest" is that generated at step 204. The "information density" is that calculated at step 206. The "constant value" is chosen so that the threshold speed can be appropriately compared with a radial speed to be calculated below with reference to FIGS. 3A and 3B. An embodiment in which the threshold value is calculated in this way has the advantage that items of greater interest to a user 104 are more likely to be displayed as are items that are smaller, thus increasing the proportion of information displayed to the user 104 in an overlay that the user 104 is more likely to interact with.

In some embodiments, the threshold value is a predetermined value that may be the same for all objects or different for some objects. This threshold value may be set based on user preferences (e.g., based on user tolerances for large amounts of information at one time).

Figure 3B:
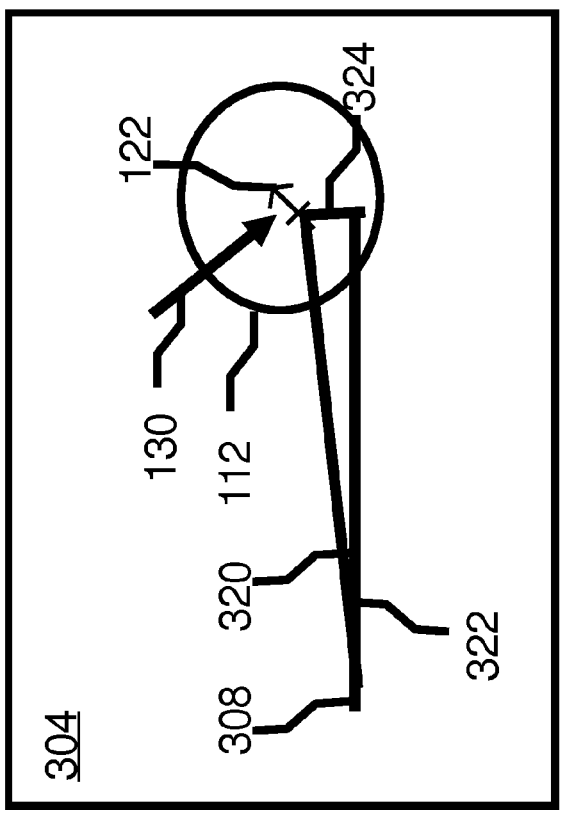
FIG. 3B shows a second frame displayed on the augmented reality display of FIG. 1.
Figure 3A:
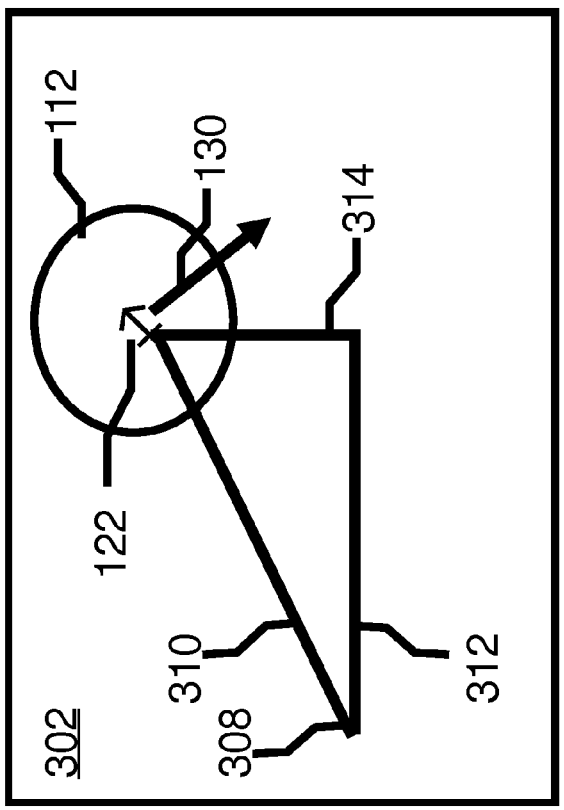
FIG. 3A shows a first frame displayed on the augmented reality display of FIG. 1.

FIG. 3A shows a first frame of data 302 and FIG. 3B a second frame of data 304 displayed on the augmented reality display 106 of FIG. 1. The overlay superimposed on the real world image of the augmented reality device 106 comprises frames 302, 304 displayed consecutively in which the position and content of the overlay changes between consecutive frames 302, 304 to correspond to the changes in the real world image seen by the user 104.

In FIG. 3A, real world object 112 and associated marker 122 are shown in a first position at the start of arrow 130 indicating the direction of movement of real world object 112. The center of the user's 104 field of view is shown at point 308. A Euclidean distance 310 between the center 308 of the user's 104 field of view and the center of the marker 122 is calculated for the position of the object 112 in the first frame 302 using positions in two orthogonal directions 312, 314. In the example of FIG. 3A, the Euclidean distance 310 is the square root of the sum of the distance 312 squared and the distance 314 squared.

In FIG. 3B, real world object 112 and associated marker 122 are shown in a second position at the end of arrow 130 indicating the direction of movement of real world object 112. The center of the user's 104 field of view remains at point 308. A Euclidean distance 320 between the center 308 of the user's 104 field of view and the center of the marker 122 is calculated for the position of the object 112 in the second frame 304 using positions in two orthogonal directions 322, 324. In the example of FIG. 3B, the Euclidean distance 320 is the square root of the sum of the distance 322 squared and the distance 324 squared.

Returning to FIG. 2, at step 210, the radial speed of the augmented reality marker 122 associated with the object 112 relative to the user 104, that is the object speed, is calculated. In this example, the object speed is the difference between a first Euclidean distance 310 between the augmented reality marker 122 in the first frame 302 and a second Euclidean distance 320 between the augmented reality marker 122 and the center 308 of the field of view of the user 104 in the second subsequent frame 304, divided by the time between the display of the first frame 302 and the display of the second subsequent frame 304. This may be calculated by subtracting the Euclidean distance 310, 320 between the center 308 of the user's 104 field of view and the center of the marker 122 for the first frame 302 from the Euclidean distance between the center 308 of the user's 104 field of view and the center of the marker 122 for the second frame 304 and dividing this distance by the elapsed time between the frames 302, 304. An embodiment in which the Euclidean distance 310, 320 and the time between frames 302, 304 is used to calculate the radial speed has the advantage of allowing fast and easy calculation of the radial speed.

At step 212, the radial speed of the augmented reality marker 122, that is, the object speed, calculated at step 210, is compared with the threshold speed for the information associated with the object 112 calculated at step 208. If the radial speed of the object 112 in the augmented reality display 106 is less than the threshold speed of the information, then the information in the overlay may be able to be comfortably focused on by the user 104 and digested before the information in the overlay moves off the screen of the augmented reality device 106. Processing continues to step 214 where the overlay is displayed on the augmented reality device 106 to the user 104 with the information associated with the object 112 included in the overlay.

If the radial speed of the object 112 in the augmented reality display 106 is greater than the threshold speed for the information associated with the object 112, then the information in the overlay may be moving off the screen too fast for the user 104 to comfortably focus on. The user 104 may not be able to digest the information in the overlay before it has moved off the display screen of the augmented reality device 106. Processing continues to step 218 where the information associated with the object 112 is filtered out and is not displayed in the overlay. Thus, responsive to the radial speed of the augmented reality marker 122 relative to the user 104 being greater than the calculated threshold value, the object is filtered out from the overlay and the filtered overlay is displayed.

If the radial speed of the augmented reality marker associated with the object 112 in the augmented reality display 106 relative to the user 104 is similar to, is equal to, or close to, the calculated threshold speed of the information associated with the object 112, then the information in the overlay may be able to be comfortably focused on by the user 104 and digested before the information in the overlay moves off the screen of the augmented reality device 106 if the information in the overlay is modified. Processing continues to step 216 where the information associated with the object 112 is modified for the overlay and then the filtered overlay is displayed on the augmented reality device 106 to the user 104. In an embodiment, the information in the overlay may be modified by filtering out the information associated with the object 112 from the overlay and incorporating in the filtered overlay a summary of the information so as to reduce an information density value for the object

112. An embodiment in which the information is summarized has the advantage of still displaying a form of the information associated with the object at a location where the object 112 associated with the overlay is located, but also allowing the user 104 to comfortably focus on the modified information. In another embodiment, the overlay may be filtered by slowing the movement of the augmented reality marker 122 in the overlay relative to the object 112 so as to reduce the radial speed of the augmented reality marker 122 relative to the user 104. An embodiment in which the speed of the augmented reality marker is slowed in the overlay has the advantage of displaying the information associated with the object 112 in the filtered overlay, but also allowing the user 104 to comfortably focus on the information. In a less preferred embodiment, the overlay is displayed without any form of the information.

Embodiments of the method of managing augmented reality overlays displayed to a user 104 of an augmented reality device 106 described above provide the advantage that what is displayed to a user 104 is responsive to the radial speed at which information associated with an object 112 is moving out of the user's 104 field of view, thus reducing the number of pieces of information (e.g., amount of information) displayed on the screen that the user 104 would not have interacted with.

Figure 4:
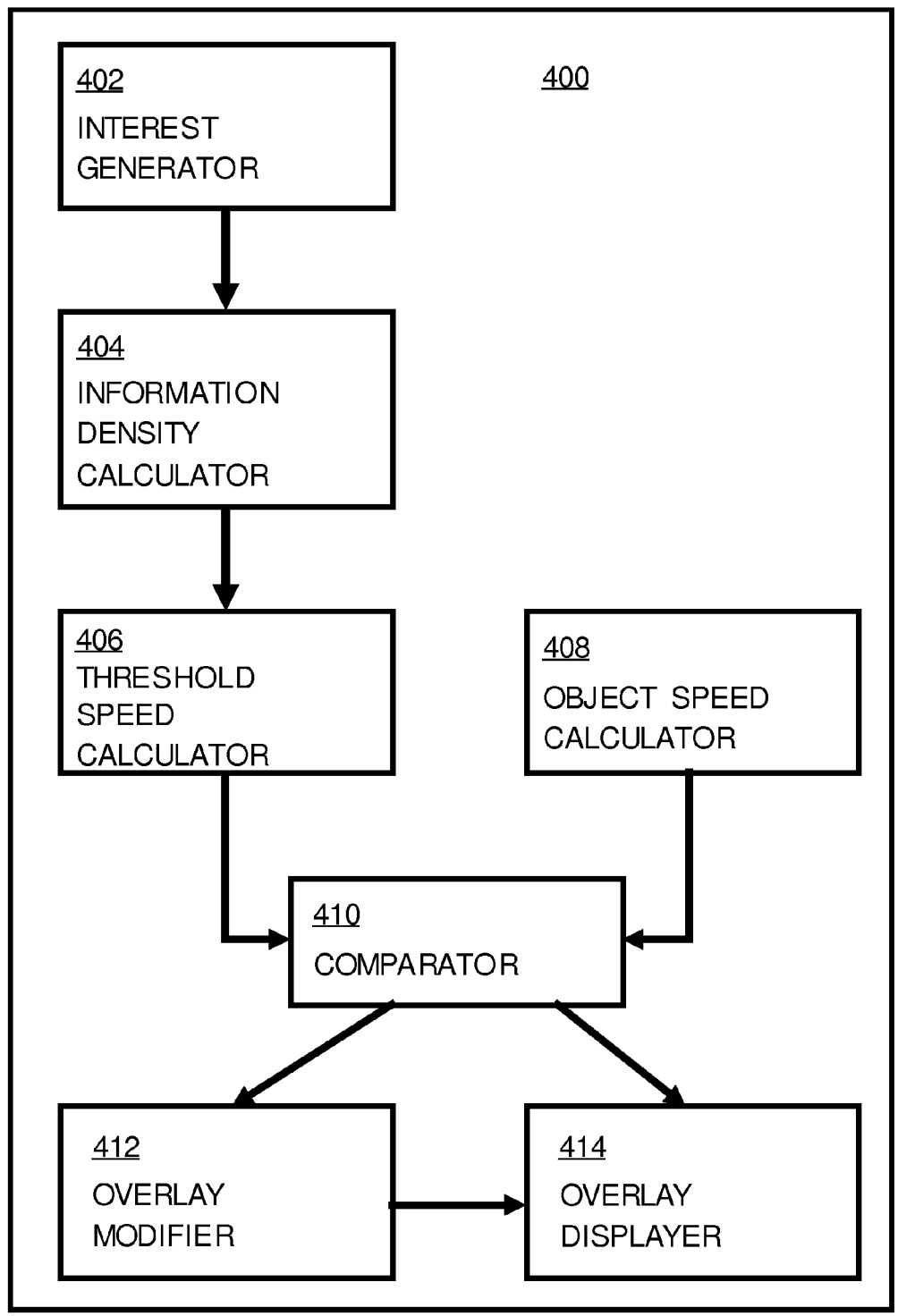
FIG. 4 shows an embodiment of a system of managing augmented reality overlays according to the present invention.

FIG. 4 shows an embodiment of a system 400 according to the present invention. Interest generator 402 generates a "level of interest" of the information associated with an object 112 to the user 104. The "level of interest" may, for example, be determined from a preset list of preferences or settings in a user 104 profile. In another embodiment, the level of interest may be generated over a period of time by analyzing what types of information the user 104 looks at and for how long the user 104 looks at each type of information. In another embodiment, a user's 104 search habits may be used to determine her level of interest. This has the advantage that the user 104 is provided with information that it is predicted on her interests as determined by her search habits. An exemplary user 104 profile may indicate that a user 104 is interested in Italian cuisine, but not in Chinese cuisine. The level of interest associated with a Chinese restaurant will, in this example, be lower than the level of interest in an Italian restaurant.

Information density calculator 404 calculates an amount of information in the overlay associated with the object 112. The amount of information associated with the object 112 may be expressed in a conventional metric such as the number of words or the number of pixels. Examples of low information density values may include a piece of information has just a picture and a piece of information that is placing a highlighting box over a real life object 110, 112. An example of a high density value is a piece of information that contains a whole block of text. An example of a medium density value is somewhere between these two examples, perhaps a picture with a caption, or, alternatively, short bullet points of text.

Threshold speed calculator 406 calculates a threshold speed for the information in the overlay associated with the object 112. The threshold speed represents the maximum radial speed at which the information associated with the object 112 in the overlay can be displayed whilst still allowing a user 104 to comfortably focus on all the information in the overlay (e.g., potentially both information associated with object 112 and information associated with object 110). If the information in the overlay associated with the object 112 is displayed such that it moves at a radial speed exceeding the threshold speed for that information, then a user may not be able to comfortably focus on that information in the overlay. The threshold speed calculator 406 calculates the threshold speed as described above with reference to step 208 of FIG. 2.

Object speed calculator 408 calculates the radial speed of the object 112 by subtracting the Euclidean distance between the center 308 of the user's 104 field of view and the center of the marker 122 for the first frame 302 from the Euclidean distance between the center 308 of the user's 104 field of view and the center of the augmented reality marker 122 for the second frame 304 and dividing this distance by the elapsed time between the frames. This calculation was described earlier with reference to step 210 of FIG. 2.

Comparator 410 compares the radial speed of the augmented reality marker 122 calculated by the object speed calculator 408 with the threshold speed calculated by the threshold speed calculator 406. If the radial speed of the object 112 in the augmented reality display 106 is less than the threshold speed for the information associated with the object 112, then the information in the overlay will be able to be comfortably focused on by the user 104 and digested before the information in the overlay moves off the screen of the augmented reality device 106. Overlay displayer 414 then displays the overlay on the augmented reality device 106 with the information associated with object 112 included in the displayed overlay.

If the radial speed of the object in the augmented reality display 106 is greater than the threshold speed for information associated with the object 112, then this information in the overlay may be moving off the screen too fast for the user 104 to comfortably focus on. The user 104 may not be able to digest the information in the overlay before it has moved off the display screen of the augmented reality device 106. Overlay displayer 414 filters out the information associated with the object 112 from the overlay and displays the filtered overlay (e.g., without the information associated with the object 112) on the augmented reality device 106.

If the radial speed of the augmented reality marker associated with the object 112 in the augmented reality display 106 is similar to, that is equal to, or close to, the calculated threshold speed of the information associated with the object 112, then the information in the overlay may be able to be comfortably focused on by the user 104 and digested before this information in the overlay moves off the screen of the augmented reality device 106 if this information is modified. Overlay modifier 412 modifies the information associated with the object 112 in the overlay and then passes filtered overlay including the modified information to overlay displayer 414 for display on the augmented reality device 106. In an embodiment of the overlay modifier 412, the overlay may be filtered by summarizing the information associated with the object 112 so as to reduce the amount of information displayed. In another embodiment of the overlay displayer 412, the overlay may be filtered by slowing down the information associated with the object 112 so that it moves off the display of the augmented reality device 106 at a slower radial speed than the augmented reality marker 122 associated with the object 112 does.

In another embodiment of the present invention, the speed of the augmented reality marker 120, 122 relative to the user 104 that is compared is not the radial speed measured in two dimensions as depicted in FIGS. 3A and 3B, but is instead the total speed of the augmented reality marker 120, 122 relative to the user 104, measured in three dimensions. In the circumstances where the augmented reality marker 120, 122 is moving directly away from the user, the radial speed of the augmented reality marker 120, 122 relative to the user will be zero, but the total speed of the augmented reality marker 120, 122 relative to the user may be significant. If the information associated with objects 110, 112 gets smaller the further away the augmented reality marker 120, 122 gets, then the information density, as calculated at step 206, may increase as the augmented reality marker 120, 122 moves away from the user 104. This may result in difficulty in the user 104 digesting the information in the overlay associated with the objects 110, 112 before this information displayed on the display screen of the augmented reality device 106 gets too small. Using the total speed of the augmented reality marker 120, 122 relative to the user 104 has the advantage that the display of information which get smaller the further away the augmented reality marker 120, 122 gets may be managed in the same manner as described above for information associated with objects that are moving too fast for the user 104 to digest the information in the overlay in a timely manner.

In this embodiment, the threshold speed for the information in the overlay associated with the object 110, 112, calculated at step 208, may reduce as the augmented reality marker 120, 122 gets further away from the user 104 and the information gets smaller. This is because the information density increases due to the same information being displayed on a smaller area of the display screen of the augmented reality device 106. The total object speed is compared, at step 212, with the threshold speed in the same manner as when the radial speed of the object is used.

In this embodiment, the information in the overlay associated with the object 110, 112 may be modified by summarizing the piece of information so as to reduce the information density of the information displayed on the screen of the augmented reality device 106 to be comfortably focused on by the user 104 and digested before the information becomes too small. In another embodiment, the information in the overlay associated with the object 110, 112 may be slowed down so that it moves away from the user of the augmented reality device 106 at a slower speed than the augmented reality marker 120, 122 associated with the object 110, 112 does. As with the embodiment described above using the radial speed of the augmented reality marker 120, 122, the information associated with the object 110, 112 may be simply filtered out of the overlay, and the filtered overlay may be displayed if the information is going to be too small for the user 104 to digest.

In this embodiment, the total speed is calculated in the same manner as shown in FIGS. 3A and 3B, except that the calculation of the Euclidean distance is carried out in three dimensions, instead of just two dimensions, the third dimension being orthogonal to both the first direction 312, 322 and the second direction 314, 324.

In an embodiment of a system according to the present invention, the comparator 410 compares the total speed of the augmented reality marker 120, 122 relative to the user 104 and not the radial speed measured in two dimensions as depicted in FIGS. 3A and 3B. The information density calculator 404 may calculate an increased information density value as the augmented reality marker 120, 122 moves away from the user 104. This may result in difficulty in the user 104 digesting the information in the overlay before the information associated with the object 110, 112 displayed in overlay on the display screen of the augmented reality device 106 gets too small.

In this embodiment, the threshold speed calculator 406 may calculate a reduced threshold speed as the augmented reality marker 120, 122 gets further away from the user 104 and the information associated with the object 110, 112 gets smaller. This is because the information density increases due to the same information being displayed on a smaller area of the display screen of the augmented reality device 106. The comparator 410 compares the total object speed with the threshold speed in the same manner as when the radial speed of the object is used.

In this embodiment, the overlay modifier 412 may modify the information in the overlay by summarizing the information associated with the object 110, 112 so as to reduce the information density of the information displayed on the screen of the augmented reality device 106 to be comfortably focused on by the user 104 and digested before the information becomes too small. In another embodiment of the overlay displayer 412, the information in the overlay associated with the object 110, 112 may be slowed down so that it moves off the display of the augmented reality device 106 at a slower radial speed than the augmented reality marker 120,122 associated with the object 110, 112 does. As with the embodiment described above using the radial speed of the augmented reality marker 120, 122, the overlay modifier 412 may simply display a filtered overlay not including the information associated with the object 110, 112 if it is going to be too small for the user 104 to digest.

In this embodiment, the total speed is calculated by the object speed calculator 408 in the same manner as shown in FIGS. 3A and 3B, except that the calculation of the Euclidean distance is carried out in three dimensions, instead of just two dimensions, the third dimension being orthogonal to both the first direction 312, 322 and the second direction 314, 324.

Figure 5:
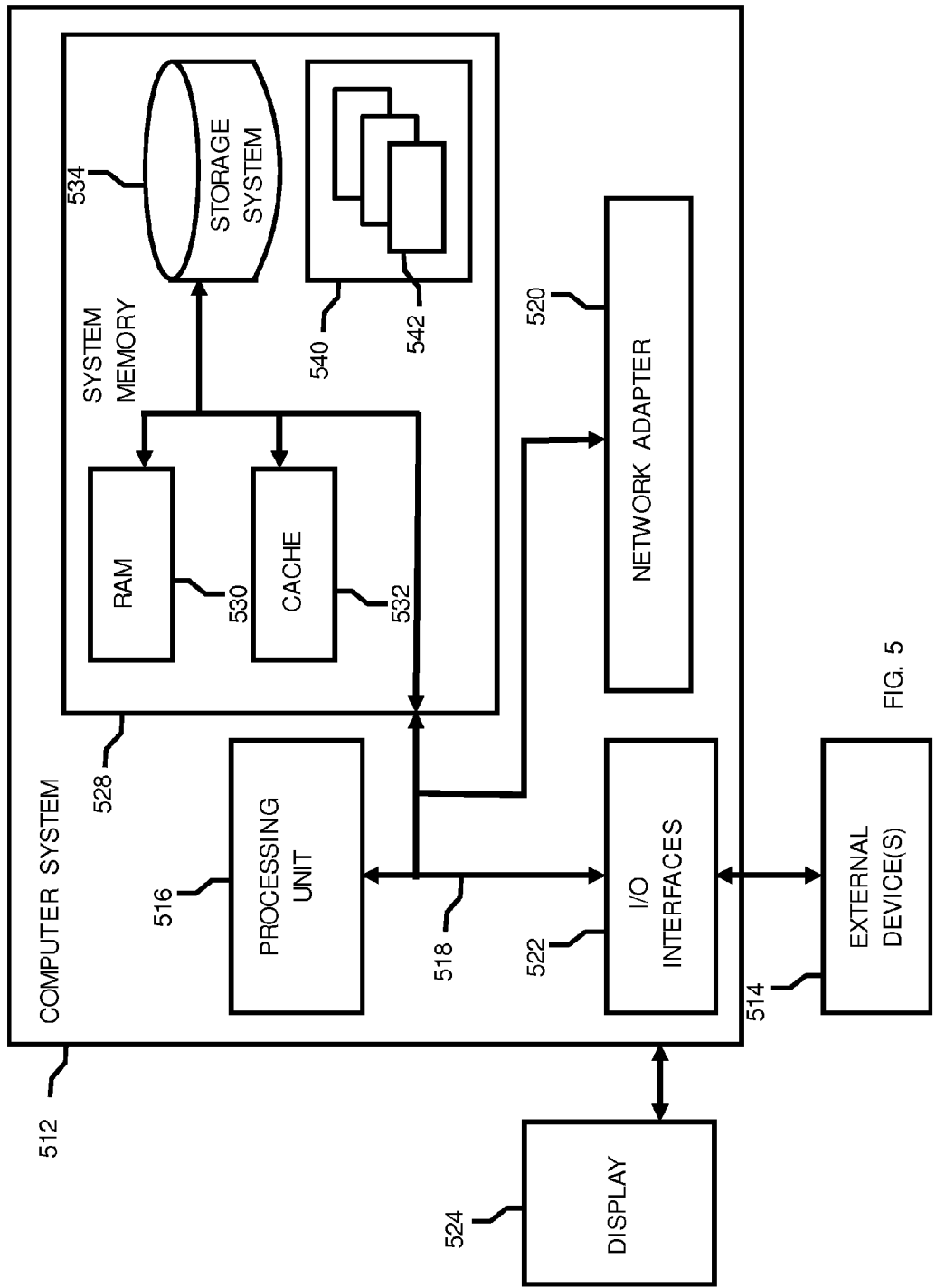
FIG. 5 shows a computer system in which embodiments of the present invention may be practised.

Referring now to FIG. 5, a schematic of an example of a computing system, in which embodiments of the method of managing augmented reality overlays, is shown. The computing system is only one example of a suitable computing system and is not intended to suggest any limitation as to the scope of use or functionality of embodiments of the invention described herein. Regardless, the computing system is capable of being implemented and/or performing any of the functionality set forth hereinabove.

Computer system/server 512 is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing augmented reality overlays for display to a user of an augmented reality device, comprising:
   receiving an object, the object being associated with an augmented reality marker within a field of view of the user, information associated with the object being for display in an overlay;
   calculating a speed of the augmented reality marker relative to the user, wherein the speed of the augmented reality marker relative to the user is a difference between a first Euclidean distance between the augmented reality marker and a center of the field of view of the user in a first frame and a second Euclidean distance between the augmented reality marker and the center of the field of view of the user in a second subsequent frame, divided by a time between the first frame and the second subsequent frame;
   comparing the speed of the augmented reality marker with a threshold value;
   responsive to the speed of the augmented reality marker being greater than the threshold value, filtering out the information from the overlay; and
   displaying the filtered overlay on the augmented reality device.

2. The method of claim 1, further comprising:
   calculating the threshold value based on at least one of a user level of interest for the object and an information density value for the object.

3. The method of claim 2, wherein the threshold value is equal to the user level of interest for the object multiplied by a constant and divided by the information density value for the object.

4. The method of claim 1, further comprising:
   responsive to the speed of the augmented reality marker relative to the user being similar to the threshold value, filtering out the information from the overlay and incorporating in the filtered overlay a summary of the information so as to reduce an information density value for the object.

5. The method of claim 1, further comprising:
   responsive to the speed of the augmented reality marker relative to the user being similar to the threshold value, filtering the overlay by slowing a movement of the augmented reality marker in the overlay relative to the object so as to reduce the speed of the augmented reality marker relative to the user.

6. The method of claim 1, wherein the information associated with the object being for display in the overlay includes an annotation, and wherein the filtering out the information from the overlay comprises filtering out the annotation from the overlay.

7. The method of claim 6, wherein the filtering out the annotation from the overlay reduces an amount of the information included in the overlay.

8. The method of claim 6, wherein the filtering out the annotation from the overlay comprises performing an action selected from the group consisting of: reducing an amount of the information in the annotation or entirely removing the annotation from the overlay.

9. The method of claim 6, wherein the filtering out the annotation from the overlay comprises reducing an amount of the information in the overlay by removing the annotation from the overlay.

10. A method of managing augmented reality overlays for display to a user of an augmented reality device, comprising:
- receiving an object, the object being associated with an augmented reality marker within a field of view of the user, information associated with the object being for display in an overlay;
- calculating a speed of the augmented reality marker relative to the user;
- calculating a threshold value based on a user level of interest for the object and an information density value for the object, wherein the threshold value is equal to the user level of interest for the object multiplied by a constant and divided by the information density value for the object;
- comparing the speed of the augmented reality marker with the threshold value;
- responsive to the speed of the augmented reality marker being greater than the threshold value, filtering out the information from the overlay; and
- displaying the filtered overlay on the augmented reality device.

11. The method of claim 10, wherein the calculating the speed of the augmented reality marker relative to the user includes calculating a radial speed of the augmented reality marker relative to the user.

12. The method of claim 10, wherein the speed of the augmented reality marker relative to the user is a difference between a first Euclidean distance between the augmented reality marker and a center of the field of view of the user in a first frame and a second Euclidean distance between the augmented reality marker and the center of the field of view of the user in a second subsequent frame, divided by a time between the first frame and the second subsequent frame.

13. The method of claim 10, further comprising:
- responsive to the speed of the augmented reality marker relative to the user being similar to the threshold value, filtering out the information from the overlay and incorporating in the filtered overlay a summary of the information so as to reduce an information density value for the object.

14. The method of claim 10, further comprising:
- responsive to the speed of the augmented reality marker relative to the user being similar to the threshold value, filtering the overlay by slowing a movement of the augmented reality marker in the overlay relative to the object so as to reduce the speed of the augmented reality marker relative to the user.

15. The method of claim 10, wherein the information associated with the object being for display in the overlay includes an annotation, and wherein the filtering out the information from the overlay comprises filtering out the annotation from the overlay.

16. The method of claim 15, wherein the filtering out the annotation from the overlay reduces an amount of the information included in the overlay.

17. The method of claim 15, wherein the filtering out the annotation from the overlay comprises performing an action selected from the group consisting of: reducing an amount of the information in the annotation or entirely removing the annotation from the overlay.

18. The method of claim 15, wherein the filtering out the annotation from the overlay comprises reducing an amount of the information in the overlay by removing the annotation from the overlay.

* * * * *